(12) United States Patent
Sørensen

(10) Patent No.: US 11,221,064 B2
(45) Date of Patent: Jan. 11, 2022

(54) BELT DRIVE TRANSMISSION SYSTEM

(71) Applicant: AGCO International GmbH, Neuhausen (CH)

(72) Inventor: Jakob Bro Sørensen, Randers (DK)

(73) Assignee: AGCO International GmbH, Neuhausen (CH)

( * ) Notice: Subject to any disclaimer, the term of this patent is extended or adjusted under 35 U.S.C. 154(b) by 739 days.

(21) Appl. No.: 16/071,185

(22) PCT Filed: Jan. 10, 2017

(86) PCT No.: PCT/EP2017/050415
§ 371 (c)(1),
(2) Date: Jul. 19, 2018

(87) PCT Pub. No.: WO2017/137196
PCT Pub. Date: Aug. 17, 2017

(65) Prior Publication Data
US 2021/0207694 A1 Jul. 8, 2021

(30) Foreign Application Priority Data
Feb. 8, 2016 (GB) .................................... 1602224

(51) Int. Cl.
*F16H 37/08* (2006.01)
*F16H 61/662* (2006.01)
(Continued)

(52) U.S. Cl.
CPC ......... *F16H 37/0846* (2013.01); *B60K 17/08* (2013.01); *B62D 49/06* (2013.01);
(Continued)

(58) Field of Classification Search
CPC ............ F16H 37/0846; F16H 61/0202; F16H 61/662; F16H 61/0248; F16H 2037/0886;
(Continued)

(56) References Cited

U.S. PATENT DOCUMENTS 1,015,481 A * 1/1912 Draullette ............... F16H 48/08
475/204
3,625,072 A * 12/1971 Bobard .................. B60K 17/08
74/15.4
(Continued)

FOREIGN PATENT DOCUMENTS

CN 202201123 U 4/2012
DE 21 25 504 A1 12/1971
(Continued)

OTHER PUBLICATIONS

DT2125504 machine translation filed Apr. 29, 2021 (Year: 2021).*
(Continued)

*Primary Examiner* — Tisha D Lewis

(57) ABSTRACT

A transmission system for a vehicle having a belt drive transmission. The belt drive has an adjustable input and output ratio, where the output of the belt drive is provided as a first input to a differential coupling. A further rotating connection is provided as a second input to the differential coupling, so that the output of the differential coupling is
(Continued)

arranged as the output of the transmission system. Accordingly, the transmission output is based on the aggregate sum of the rotation of the first and second inputs to the differential coupling, wherein adjustment of the input and output ratio of the belt drive allows for a continuously variable transmission system.

8 Claims, 4 Drawing Sheets

(51) Int. Cl.
- *B60K 17/08* (2006.01)
- *B62D 49/06* (2006.01)
- *F16H 61/02* (2006.01)
- *F16H 61/66* (2006.01)

(52) U.S. Cl.
CPC ....... *F16H 61/0202* (2013.01); *F16H 61/662* (2013.01); *B60Y 2200/221* (2013.01); *F16H 61/0248* (2013.01); *F16H 2037/0886* (2013.01); *F16H 2061/6601* (2013.01); *F16H 2061/66295* (2013.01)

(58) Field of Classification Search
CPC ... F16H 2061/6601; F16H 2061/66295; F16H 2009/163; F16H 2009/166; B60K 17/08
See application file for complete search history.

(56) References Cited

U.S. PATENT DOCUMENTS

| | | | |
|---|---|---|---|
| 5,445,580 A * | 8/1995 | Parraga Garcia ... | F16H 37/0846 477/211 |
| 6,537,175 B1 * | 3/2003 | Blood ................ | B60K 6/105 477/44 |
| 2013/0165289 A1 * | 6/2013 | Yamada ............ | F16H 37/0846 475/210 |
| 2013/0275014 A1 | 10/2013 | Yang | |

FOREIGN PATENT DOCUMENTS

| | | | |
|---|---|---|---|
| DE | 26 45 577 A1 | 4/1977 | |
| DE | 32 26 823 A1 | 1/1984 | |
| EP | 0170327 A1 * | 2/1986 | ............ B62D 11/10 |
| EP | 1 177 934 A2 | 2/2002 | |
| GB | 2086496 A | 5/1982 | |
| NL | 7709316 A | 2/1979 | |

OTHER PUBLICATIONS

DE3226823 machine translation filed Apr. 29, 2021 (Year: 2021).*
UK Intellectual Property Office, International Search Report for related UK Application No. GB1602224.6, dated Jul. 12, 2016.
European Patent Office, International Search Report for related International Application No. PCT/EP2017/050415, dated Mar. 27, 2017.

* cited by examiner

BELT DRIVE TRANSMISSION SYSTEM

BACKGROUND OF THE INVENTION

Field of the Invention

The present invention relates to a belt drive transmission system for a vehicle, preferably an agricultural tractor, and a vehicle having such a transmission system.

Description of Related Art

Transmission systems are an important feature of vehicle construction, providing for the transfer of motive power from an engine or prime mover to the wheels or tracks of the vehicle. While the most common types of transmission systems have relied on arrangements of selectable gears, continuously-variable transmission systems (CVTs) are becoming the transmission of choice.

One example of a CVT is the Vario transmission produced by AGCO Corporation, a hydrostatic CVT which uses variable displacement pumps to vary the fluid flow into hydrostatic motors. Such hydrostatic transmissions can be relatively expensive to implement and service.

Another example of a CVT is the belt-driven transmission system used in the Variomatic system, produced by DAF. In the Variomatic transmission, adjustable belt drives are arranged between the engine and each of the driven wheels. Adjustment of the belt drives allows for the variation of the wheel speed, as well as allowing the wheels to rotate at different speeds. In addition, reverse drive is provided by reversing the entire drive system. While such a belt drive system can be relatively inexpensive and light-weight, the stresses involved in continual change of drive direction between forward and reverse drive can lead to high levels of component failure and increased service costs.

It is an object of the invention to provide an improved transmission system.

SUMMARY OF THE INVENTION

Accordingly, there is provided a belt drive transmission system for a vehicle having a prime mover and a driven axle to be driven by the transmission system, the transmission system comprising:

an input shaft to be driven by a prime mover of the vehicle;

a first belt drive having an input and an output, the first belt drive driven in a first direction by the input shaft, the first belt drive having an adjustable input:output ratio;

a second drive having an input and an output, the input driven by the input shaft; and a differential coupling having an output to be connected to a vehicle driven axle, the differential coupling driven by the outputs of the first belt drive and the second drive to provide an aggregate drive at the output of the differential coupling, wherein the output of the differential coupling can be varied by adjusting the input:output ratio of the first belt drive.

By using the output of a differential to drive the driven axle, accordingly the driven axle speed is based on the aggregate of the speeds of the first and second drives, which can provide for wide variation of drive speed, with minimal system cost and weight. The use of a belt drive allows for the drive speed to be easily varied, and which can be relatively easily serviced.

In one aspect, the second drive comprises a fixed shaft between the input shaft of the transmission system and the input to the differential coupling.

Providing a fixed shaft between the transmission input and the differential allows for a fixed output speed provided to the differential coupling, and wherein the output speed of the transmission system can be controlled by adjusting the input:output ratio of the belt drive, to provide for an aggregate output of the first and second first and second drives.

Preferably, the transmission system further comprises a forward-reverse selector coupled to the output of the differential coupling.

For embodiments using a fixed drive shaft as the second drive, it will be understood that the first and second drives are preferably driven in the same direction. Accordingly, the transmission system further utilises a forward-reverse selector provided downstream of the differential, to allow the transmission to output both forward and reverse drive.

In a particularly preferred embodiment, the second drive comprises a second belt drive, the second belt drive driven in a second direction by the input shaft, the second direction an opposite direction to the first direction, wherein the output of the differential coupling is driven in a forward or reverse direction based on the output speeds of the first and second belt drives.

As the differential coupling is arranged to output the aggregate of the first and second belt drives, accordingly the output of the transmission system is based on the difference between the speeds of the first and second belt drives. If the first belt drive is faster than the second belt drive, then the differential output will be driven in the first direction over the second direction, and vice versa. The use of two belt drives in this configuration provides a continuously variable transmission having relatively low cost, relatively low weight, and which is relatively easily serviceable.

It will be understood that in a preferred embodiment, the first direction corresponds to a forward drive direction, and the second direction corresponds to a reverse drive direction.

Preferably, the first and second belt drives comprise at least one variator arranged to adjust the input:output ratio of the at least one of the first and second belt drives. The variator may be of any suitable construction, e.g. a cone variator, a pulley variator. In addition, it will be understood that the term belt drive may also refer to a chain drive system.

Preferably, the first belt drive and the second belt drive comprise separately adjustable input:output ratios.

The input:output ratios of the belt drives may be adjusted to control the output speeds of the belt drives. It will be understood that if the outputs of the first and second belt drives run at the same speed, but in opposite directions, accordingly the output of the differential coupling does not rotate, and the transmission is in a neutral drive state. Similarly, if the output of one of the belt drives runs at a faster speed than the other of the belt drives, consequently the output of the differential coupling will rotate in the direction dictated by the relatively faster belt drive. Depending on which belt drive is rotating faster, as a result the output of the differential coupling will rotate in either a forward or a reverse direction.

There is further provided a vehicle, preferably an agricultural or off-road vehicle, comprising:

an engine;

a driven axle; and a belt drive transmission as described above, the input shaft of the belt drive transmission driven by the engine, the output of the differential coupling driving the driven axle.

In a preferred embodiment, the driven axle is a rear axle of the vehicle.

For vehicles having a front-mounted engine, the belt drives of the transmission can be arranged to extend in a longitudinal direction between the forwardly-located engine and the rear axle. Alternatively, the driven axle can be a front axle of the vehicle.

Preferably, the vehicle comprises an electronic control unit (ECU), the ECU operable to control an adjustable input:output ratio of at least one of the first and second belt drives.

Preferably, the first direction corresponds to a forward drive direction and the second direction corresponds to a reverse drive direction, wherein the vehicle comprises a user input, the ECU operable to receive from the user input an request for forward direction or reverse direction, and when forward direction is requested, the ECU controls the first and second belt drives such that the output of the first belt drive is greater than the output of the second belt drive, to provide a forward drive output to the driven axle; and when reverse direction is requested, the ECU controls the first and second belt drives such that the output of the second belt drive is greater than the output of the first belt drive, to provide a reverse drive output to the driven axle.

Preferably, the vehicle comprises a throttle input, wherein the ECU receives throttle data from the throttle input, and wherein the ECU controls the first and second belt drives to adjust the output of the transmission based on the throttle data.

Preferably, the vehicle further comprises a speed select mechanism having an input and an output, the output of the belt drive transmission provided as input to the speed select mechanism, and the output of the speed select mechanism connected to the driven axle, and wherein the speed select mechanism is adjustable between a plurality of different speeds.

The speed select mechanism may comprise a speed changing gearbox, for example a plurality of selectable gear connections arranged between the input and the output of the speed select mechanism. It will be understood that an electronic control unit (ECU) can control the operation of the speed select mechanism to adjust the drive speed provided to the driven axle, e.g. between a high range or a low range gear.

BRIEF DESCRIPTION OF THE DRAWINGS

Embodiments of the invention will now be described, by way of example only, with reference to the accompanying drawings, in which.

DETAILED DESCRIPTION OF THE INVENTION

Figure 1:
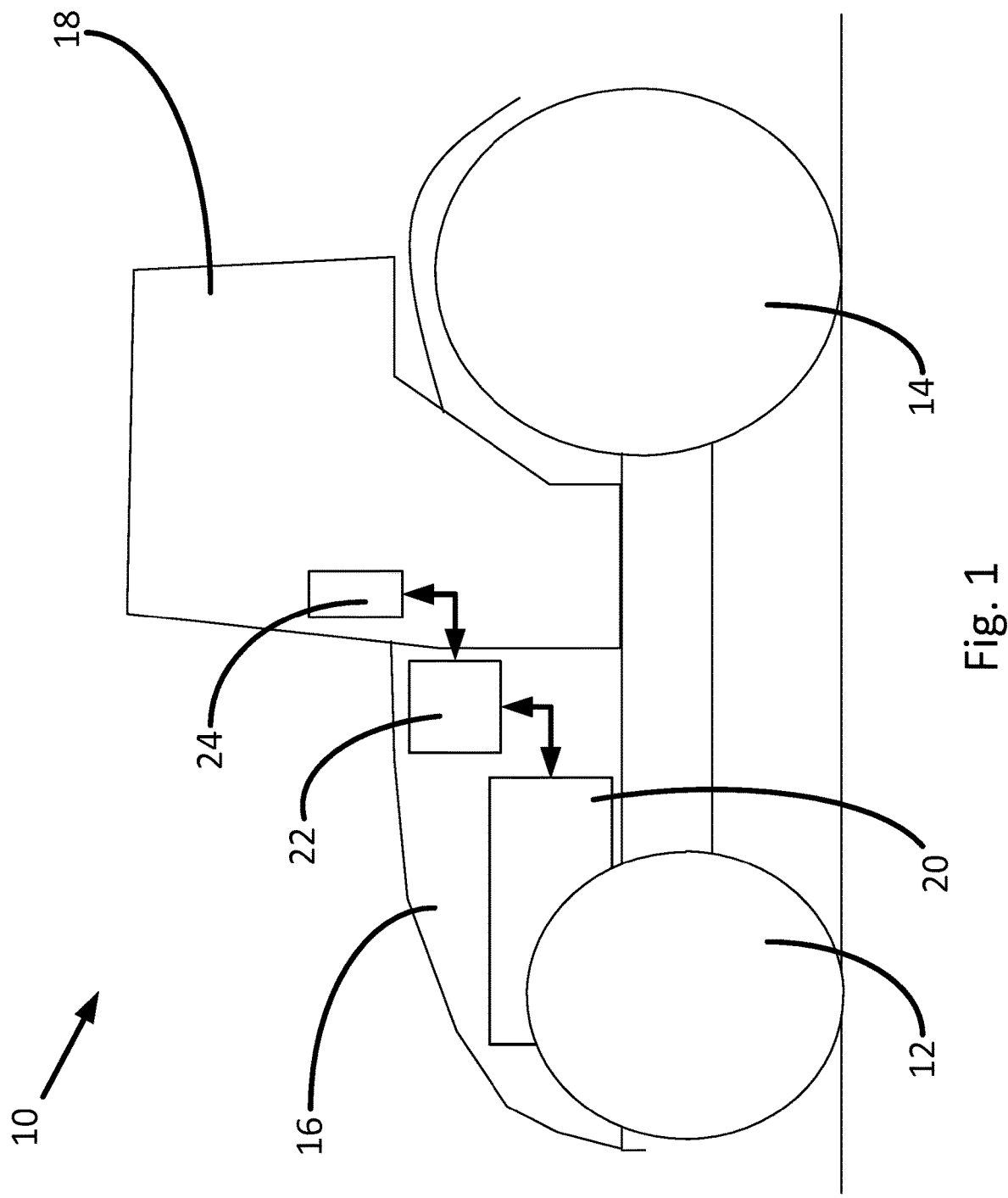
FIG. 1 is an illustration of an agricultural tractor according to the invention.

In FIG. 1, a vehicle in the form of an agricultural tractor is indicated at 10. The tractor 10 comprises front wheels 12 which are provided on a front axle and rear wheels 14 which are provided on a rear axle. The tractor 10 comprises an engine section 16 and a cab section 18. An engine 20 is provided in the engine section 16 of the tractor 10, the engine 20 arranged to provide motive force in the form of a rotating shaft.

The tractor 10 further comprises at least one Electronic Control Unit (ECU) 22, which is arranged to control operation of various tractor systems. The cab section 18 is provided with operator controls 24 for control of the different components of the tractor 10. The operator controls 24 may comprise mechanical levers and/or electronic control systems incorporating configurable switches, touchscreen displays, etc. It will be understood that the ECU 22 is provided in communication with the engine 20 and with the operator controls 24.

Figure 2:
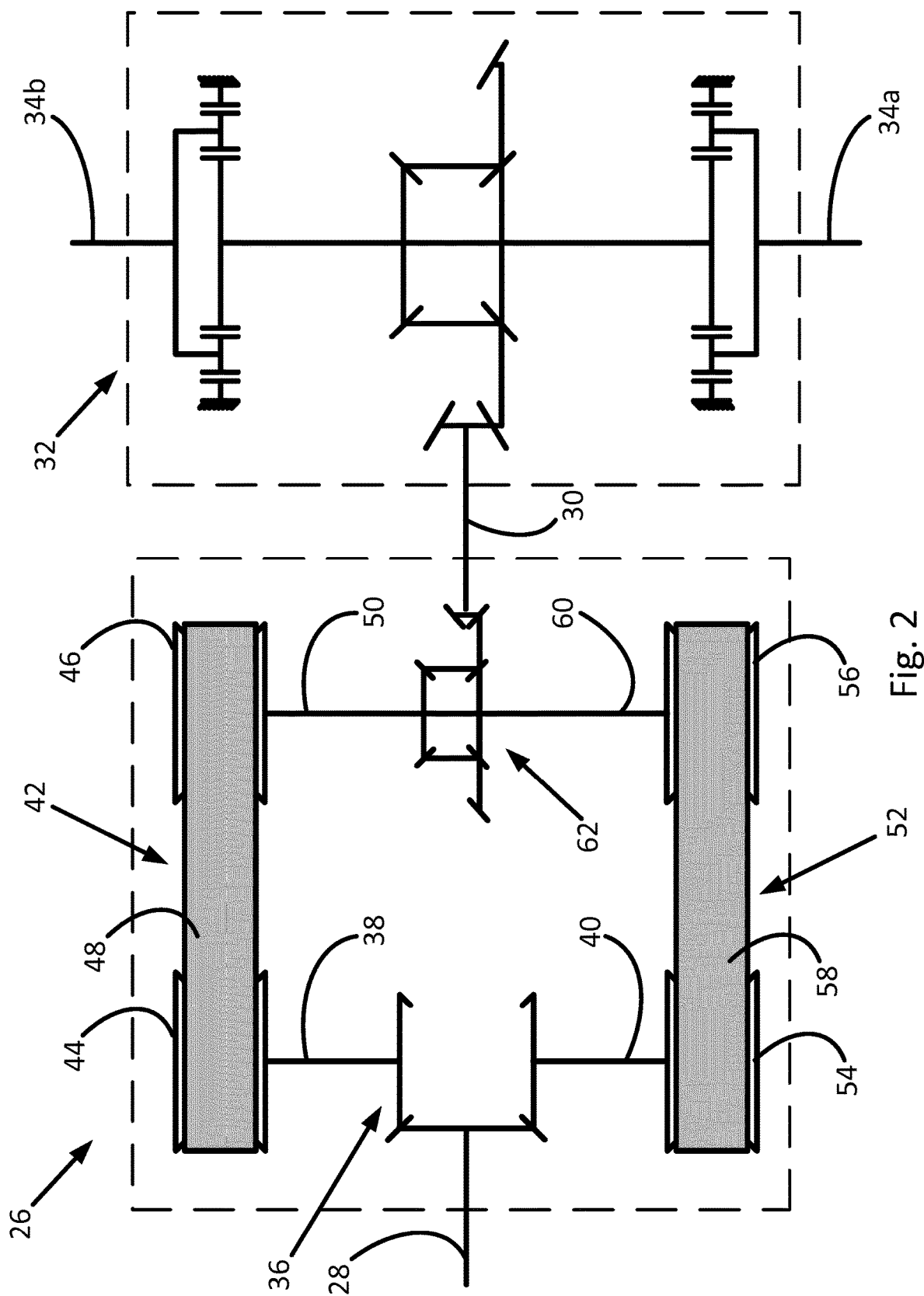
FIG. 2 is an illustration of a first embodiment of a transmission system for a vehicle according to the invention.

The tractor 10 further comprises a transmission system arranged to transfer power from the engine 20 to a driven axle of the tractor 10, which may be the front or rear axle. With reference to FIG. 2, a first embodiment of a transmission system according to the invention is indicated at 26. The transmission system 26 comprises an input 28, which is to be driven by engine 20, and an output 30, which is to be coupled with a rear axle system 32 arranged to drive rear wheels 14 via left and right driven rear axles 34a,34b. It will be understood that the rear axle system 32 may comprise any suitable construction, e.g. any known final drive construction having a differential and associated gearing systems, wherein an input can be used to drive wheel axles.

The transmission system 26 comprises a bevel gear system 36 coupled to the input 28 of the transmission system 26, the bevel gear system 36 connected to a first shaft 38 rotating in a first direction and a second shaft 40 rotating in a second, opposite, direction. The first and second shafts 38,40 are arranged substantially orthogonal to the input 28. The first shaft 38 is connected as the input to a first belt drive 42, having a first input pulley 44 and a second output pulley 46, with a belt 48 connected therebetween. At least one of the first and second pulleys 44,46 is provided as an adjustable variator pulley, such that the input:output ratio of the first belt drive 42 can be varied. Accordingly, the rotational speed of an output shaft 50 coupled to the output pulley 46 can be adjusted by controlling the input:output ratio of the first belt drive 42 relative to the speed of the first shaft 38.

Similarly, the second shaft 40 is connected as the input to a second belt drive 52, having a first input pulley 54 and a second output pulley 56, with a belt 58 connected therebetween. At least one of the first and second pulleys 54,56 is provided as an adjustable variator pulley, such that the input:output ratio of the second belt drive 52 can be varied. Accordingly, the rotational speed of an output shaft 60 coupled to the output pulley 56 can be adjusted by controlling the input:output ratio of the second belt drive 52 relative to the speed of the second shaft 40.

The first and second output shafts 50,60 are arranged as inputs to a differential coupling 62, the output of the differential coupling forming the transmission output 30. As a result, the transmission output 30 is provided as the aggregate sum of the rotation of the outputs 50,60 of the first and second belt drives 42,52. As the first belt drive 42 is driven in the first direction, and the second belt drive 52 is driven in the opposite direction, accordingly, accordingly if the first belt drive 42 is faster than the second belt drive 52, the output 50 rotates faster in the first direction than the output 60 rotates in the second direction. The aggregate sum of the outputs 50,60 then causes the transmission output 30 to rotate in the first direction over the second direction. It will be understood that appropriate control of the input:output ratios of the first and second belt drives 42,52 allows for adjustment of the output 30 of the transmission across a range of speeds across both the forward and reverse directions. The use of two belt drives in this configuration provides a continuously variable transmission having relatively low cost, relatively low weight, and which is relatively easily serviceable.

Figure 3:
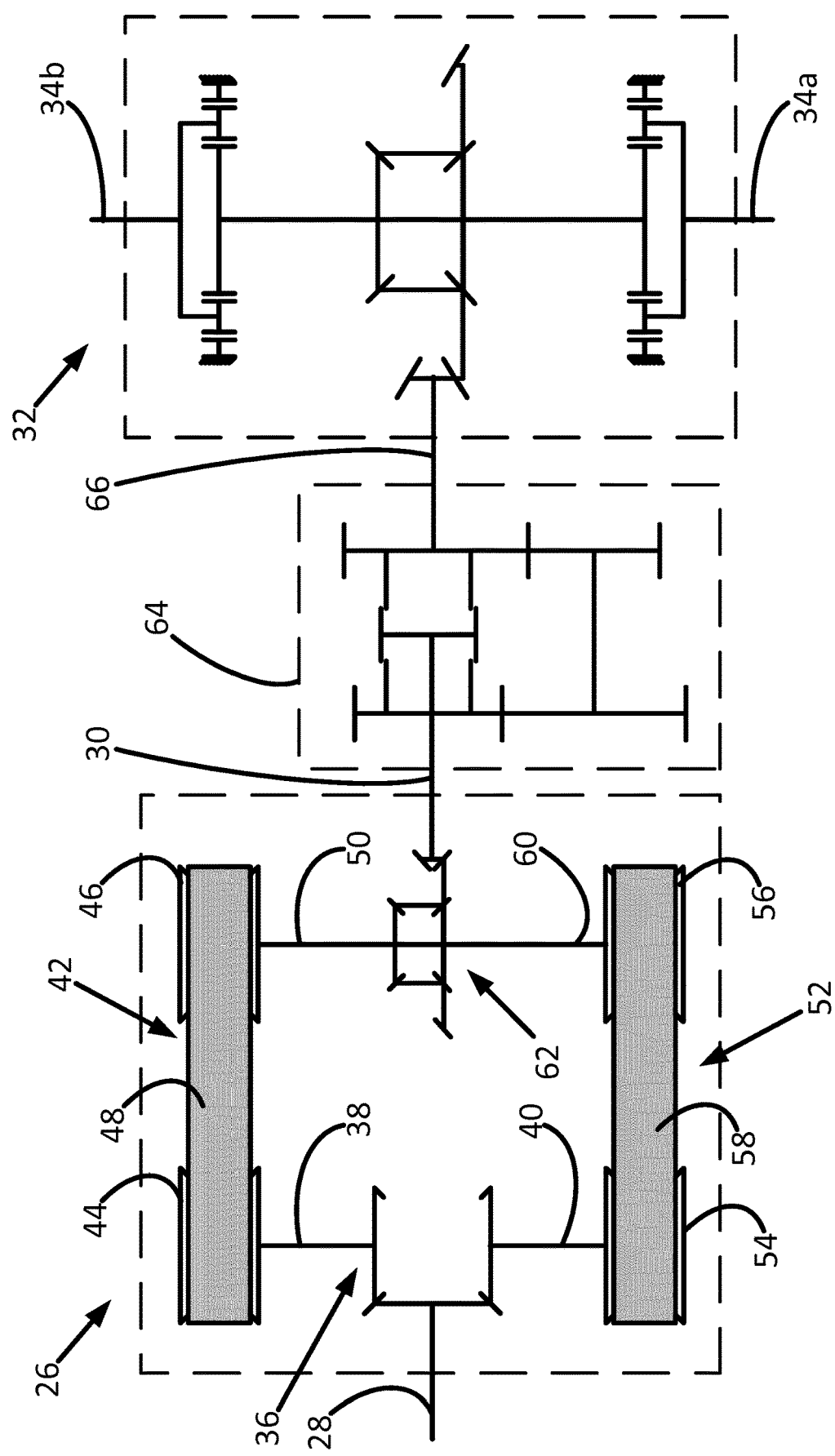
FIG. 3 is an illustration of a second embodiment of a transmission system for a vehicle according to the invention.

It will be understood that the tractor 10 comprising the transmission system 26 as described above may be implemented in any other configuration. For example, a further embodiment of a transmission system configuration is illustrated in FIG. 3, wherein the transmission system 26 and the rear axle 32 retain the same reference numerals as in the embodiment of FIG. 2. In the system of FIG. 3, the output 30 of the transmission system 26 is provided as the input to a speed select mechanism 64. The speed select mechanism 64 comprises a plurality of selectable geared connections, arranged to provide a variety of speed ranges in the transmission path between the engine 20 and the rear axle 32. The speed select mechanism 64 can be controlled by the ECU 22 or directly by the operator controls 24.

While the transmission system 30 of the above embodiments is described as having first and second belt drives both with adjustable input:output ratios, it will be understood that the transmission system may be provided with just one of the two belt drives as having an adjustable input:output ratio, wherein the other of the two belt drives operates at a defined input:output ratio.

Figure 4:
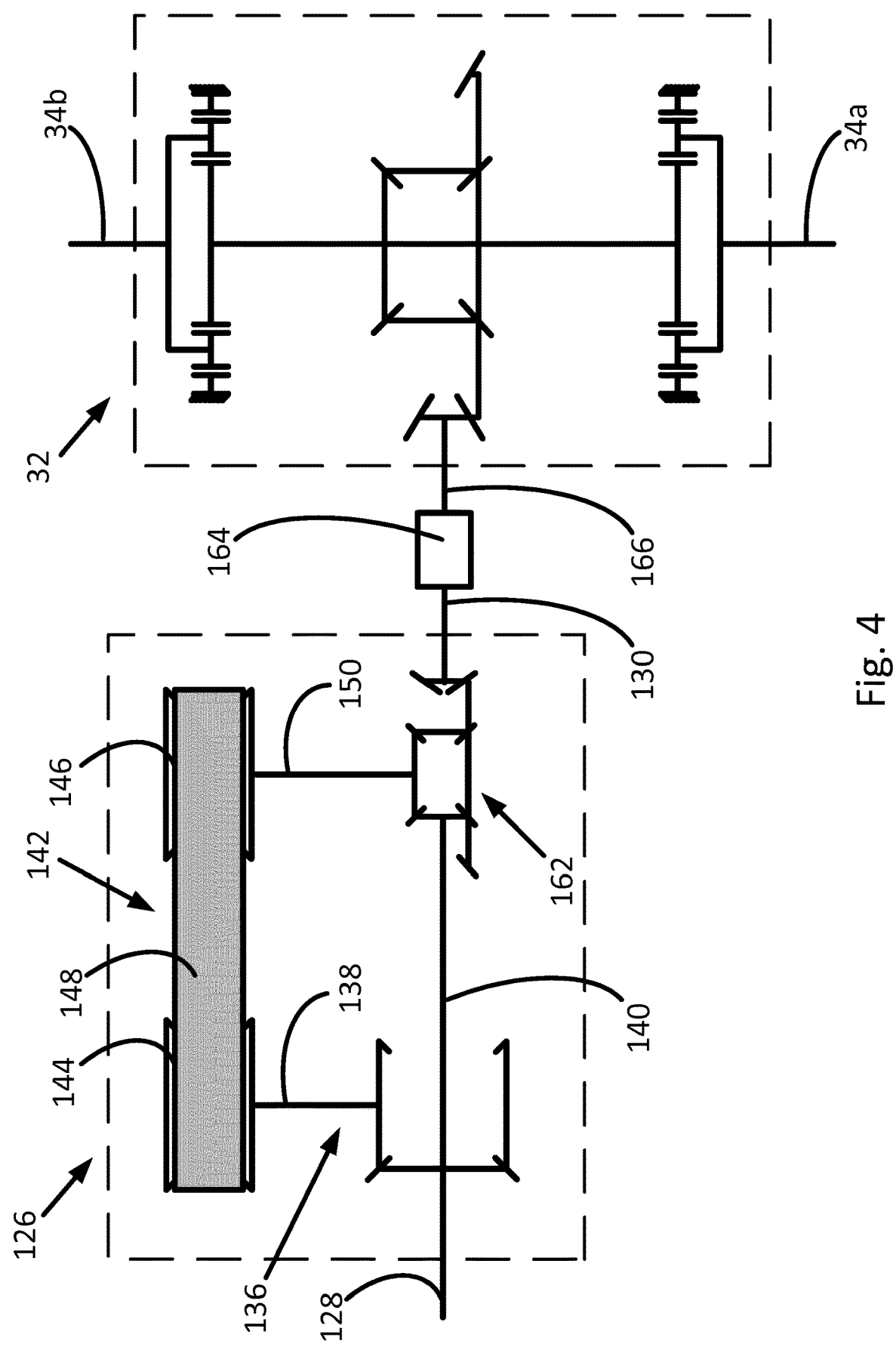
FIG. 4 is an illustration of a third embodiment of a transmission system for a vehicle according to the invention.

A further embodiment of the invention is illustrated in FIG. 4. In this embodiment, a transmission system according to the invention is indicated at 126. The transmission system 126 comprises an input 128, which is to be driven by engine 20, and an output 130.

The transmission system 126 comprises a bevel gear system 136 coupled to the input 128 of the transmission system 126, the bevel gear system 136 connected to a first orthogonal shaft 138. In addition, the transmission system 126 comprises a fixed shaft 140 arranged to rotate with the input shaft 128 from the engine 20, at the speed of the input shaft 128.

The first shaft 138 is connected as the input to a first belt drive 142, having a first input pulley 144 and a second output pulley 146, with a belt 148 connected therebetween. At least one of the first and second pulleys 144,146 is provided as an adjustable variator pulley, such that the input:output ratio of the first belt drive 142 can be varied. Accordingly, the rotational speed of an output shaft 150 coupled to the output pulley 146 can be adjusted by controlling the input:output ratio of the first belt drive 142 relative to the speed of the first shaft 138.

The first output shaft 150 and the fixed shaft 140 are arranged as inputs to a differential coupling 162, the output of the differential coupling forming the transmission output 130. As a result, the transmission output 130 is provided as the aggregate sum of the rotation of the output shaft 150 and the fixed shaft 140.

In this embodiment, the fixed shaft 140 and the first belt drive 142 are configured to both rotate in the same direction. Accordingly, the system further comprises a forward-reverse selector mechanism 164 connected to the output 130 of the transmission 126. The forward-reverse selector mechanism 164 may comprise any suitable selectable gear connection which is arranged to transfer a rotation at the input into a forward or a reverse rotation direction at an output 166 of the selector mechanism 164. The output 166 of the forward-reverse selector mechanism 164 is coupled with the rear axle system 32 arranged to drive rear wheels 14 via left and right driven rear axles 34a,34b. It will be understood that the selector mechanism 164 can be controlled by the ECU 22 or directly by the operator controls 24, to provide appropriate control of forward-reverse selection.

It will be understood that the individual features of the different embodiments may be combined without departing from the scope of the invention, for example it will be understood that the embodiment of FIG. 4 may further comprise the speed selector mechanism 64 shown in FIG. 3.

The use of such a transmission system, wherein a continuously-variable transmission is provided through the use of at least one belt drive having an adjustable input:output ratio as a first input to a differential coupling, provides a transmission system having relatively low weight and cost, and reduced service requirements compared to prior art systems.

The invention is not limited to the embodiments described herein, and may be modified or adapted without departing from the scope of the present invention.

The invention claimed is:

1. A belt drive transmission system comprising:
    an input shaft to be driven by a prime mover of a vehicle;
    a first belt drive having an input and an output, the first belt drive driven in a first direction by the input shaft, the first belt drive having an adjustable input and output ratio;
    a second belt drive having an input and an output, the second belt drive input driven by the input shaft in a second direction opposite to the first direction, the second belt drive having an adjustable input and output ratio; and
    a differential coupling having an output connected to a driven axle of the vehicle, the differential coupling driven by the outputs of the first belt drive and the second belt drive to provide an aggregate drive at the output of the differential coupling,
    wherein the output of the differential coupling can be varied by adjusting the input and output ratio of the first and second belt drives, the output of the differential coupling being driven in a forward or reverse direction based on the output speeds of the first and second belt drives;
    and wherein the transmission system further comprises a speed select mechanism having an input and an output, the output of the belt drive transmission provided as input to the speed select mechanism, and the output of the speed select mechanism connected to the driven axle, and wherein the speed select mechanism comprises a plurality of selectable geared connections arranged to provide a variety of speed ranges in the transmission path between the prime mover and the driven axle.

2. The transmission system of claim 1, wherein the first and second belt drives comprise at least one variator arranged to adjust the input and output ratio of at least one of the first and second belt drives.

3. The transmission system of claim 1, wherein the first belt drive and the second belt drive comprise separately adjustable input and output ratios.

4. An agricultural or off-road vehicle, comprising:
    an engine; and
    the belt drive transmission system as claimed in claim 1, the input shaft of the belt drive transmission driven by the engine, the output of the differential coupling driving the driven axle.

5. The vehicle of claim 4, wherein the driven axle is a rear axle of the vehicle.

6. The vehicle of claim 4, wherein the vehicle further comprises an electronic control unit (ECU), the ECU configured to control an adjustable input and output ratio of the first and second belt drives.

7. The vehicle of claim 4, wherein the vehicle further comprises a throttle input, and an electronic control unit (ECU) wherein the ECU receives throttle data from the throttle input, and wherein the ECU is configured to control the first and second belt drives to adjust the output of the transmission based on the throttle data.

8. The vehicle of claim 4, wherein the first direction corresponds to a forward drive direction and the second direction corresponds to a reverse drive direction, wherein the vehicle further comprises a user input, and an electronic control unit (ECU) configured to receive from the user input an request for forward direction or reverse direction, and
- when forward direction is requested, the ECU controls the first and second belt drives such that the output of the first belt drive is greater than the output of the second belt drive, to provide a forward drive output to the driven axle; and
- when reverse direction is requested, the ECU controls the first and second belt drives such that the output of the second belt drive is greater than the output of the first belt drive, to provide a reverse drive output to the driven axle.

* * * * *